United States Patent
Nakamura (10) Patent No.: US 6,681,823 B2
(45) Date of Patent: Jan. 27, 2004

(54) HEAVY LOAD PNEUMATIC RADIAL TIRE

(75) Inventor: Hiroshi Nakamura, Osaka (JP)

(73) Assignee: Toyo Tire & Rubber Co., Ltd., Osaka-fu (JP)

( * ) Notice: Subject to any disclaimer, the term of this patent is extended or adjusted under 35 U.S.C. 154(b) by 130 days.

(21) Appl. No.: 09/919,484

(22) Filed: Jul. 31, 2001

(65) Prior Publication Data

US 2003/0029536 A1 Feb. 13, 2003

(30) Foreign Application Priority Data

Jul. 25, 2001 (JP) .................................... 2001-224876

(51) Int. Cl.⁷ .................... B60C 11/01; B60C 11/13; B60C 101/00
(52) U.S. Cl. ............. 152/209.16; 152/209.27; 152/209.23; 152/523
(58) Field of Search ............... 152/209.16, 209.27, 152/209.23, 523

(56) References Cited

U.S. PATENT DOCUMENTS

| | | | |
|---|---|---|---|
| 3,253,635 A | * | 5/1966 | Travers |
| 4,265,287 A | * | 5/1981 | Abe et al. |
| 4,993,466 A | * | 2/1991 | Ochiai |
| 4,995,437 A | * | 2/1991 | Enoki et al. |
| 5,522,442 A | * | 6/1996 | Kishi |

FOREIGN PATENT DOCUMENTS

| | | |
|---|---|---|
| JP | 58-81806 | 5/1983 |
| JP | 64-52503 | 2/1989 |
| JP | 1-233103 | 9/1989 |
| JP | 7-164825 | 6/1995 |
| JP | 8-132824 | 5/1996 |
| JP | 8-290706 | 11/1996 |
| JP | 9-136512 | * 5/1997 |

* cited by examiner

Primary Examiner—Steven D. Maki
(74) Attorney, Agent, or Firm—Merchant & Gould, P.C.

(57) ABSTRACT

A heavy load pneumatic radial tire has the circular fine groove 5 running in the tire circumferential direction at least at one side of the shoulder portion 4 running on both sides of the tread surface 11 of the tread portion 1. The said fine groove 5 has a narrowed area with the central axis 5C of the sectional view of the groove sloping inward in the tire diameter direction from the aperture 51 to the internal part in the tire width direction and an expanded area following thereafter whose groove width expands with a curvature, and the external wall 52 of the said narrowed area slopes outward in the tire diameter direction than the central axis 5C of the said sectional view of the groove and the internal wall 53 of the said fine groove 5 is provided with the convex part 57.

2 Claims, 11 Drawing Sheets

HEAVY LOAD PNEUMATIC RADIAL TIRE

BACKGROUND OF THE INVENTION

1. Field of the Invention

This invention relates to a heavy load pneumatic radial tire which has plural of ribs divided by plural of main grooves in the circumferential direction on the tread surface of the tread portion and in more detail, relates to a technique of preventing uneven wear from being generated on the shoulder rib surface which runs on both sides of the tread surface of the said tread portion.

2. Description of the Prior Art

As heavy load pneumatic radial tires loaded on trucks, buses, or the like, which are driven on the well-paved road, as tread patterns, tires with ribs are employed more frequently than tires with blocks, from the viewpoint of wear resistance, ride quality, fuel cost, or the like. However, at the grounding part with loading, due to the bending of the side wall, particularly as for tires having ribs on the tread portion, due to the partially heavy pressure at the end part in the tire width direction of the shoulder rib, the abrasion of the part is promoted, and the shoulder rib wears earlier than the other ribs, thereby sometimes causing "side dropped abrasion" in which shoulder rib sinks like a step.

Such uneven wear begins at the external end part in the tire width direction in the shoulder rib of the tread portion and as the mileage increases, the uneven wear expands into the internal side in the tire width direction, and winds its way in the tire circumferential direction as well, thereby causing uneven wear which is so called "river wear". When the mileage further increases, ribs in the shoulder portion as a whole are worn. Consequently, a step is generated between the adjacent ribs of the shoulder portion set inside in the tire width direction interposing the main groove therebetween, thereby causing "side dropped abrasion". This "side dropped abrasion" is not preferable since it generates defective appearance and short duration of tire life.

Figure 7:
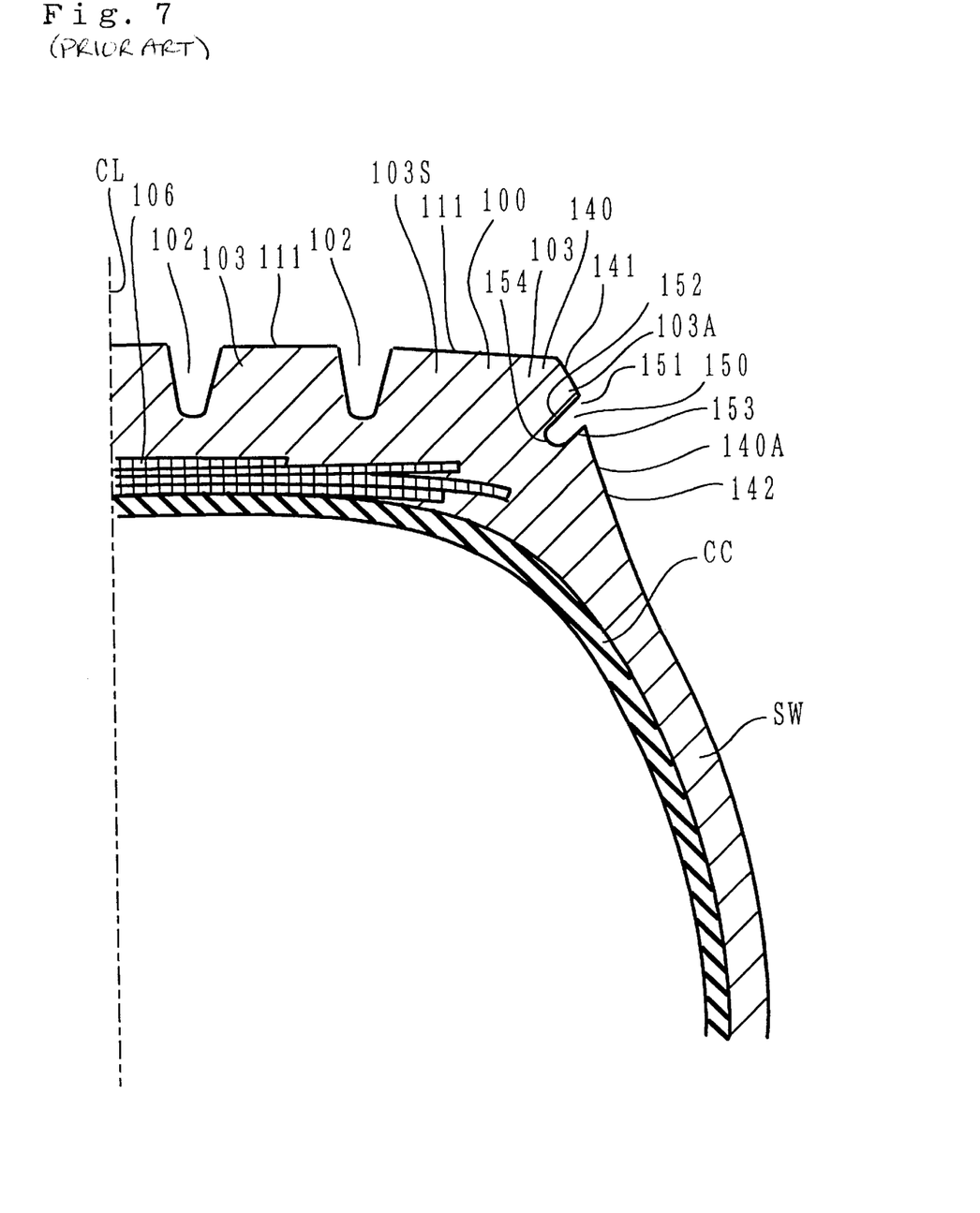
FIG. 7 shows an example of the conventional heavy load pneumatic radial tire and is a schematic local sectional view showing the right half in the tire width direction from the center line CL which vertically and equally divides the tire cross sectional view into two.
Figure 8:
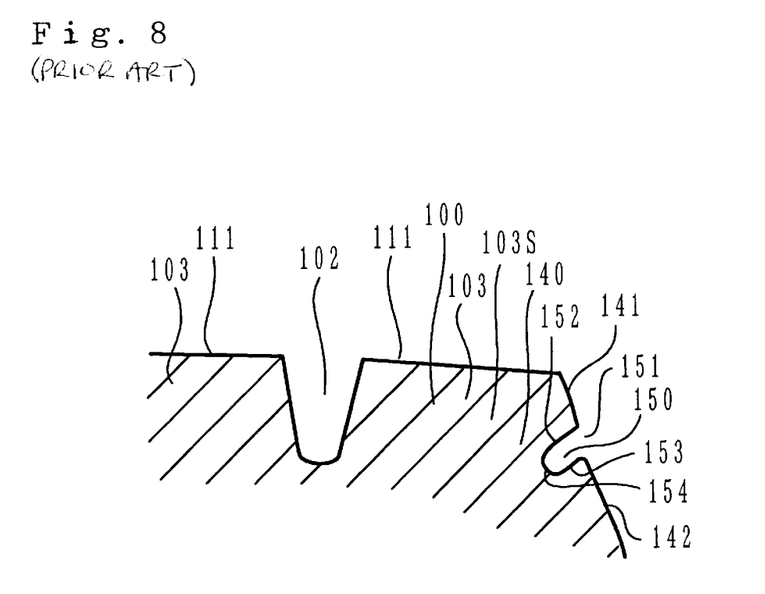
FIG. 8 is a schematic local sectional view of the tread portion showing the non grounding state when the standard internal pressure is filled in the said conventional tire.
Figure 9:
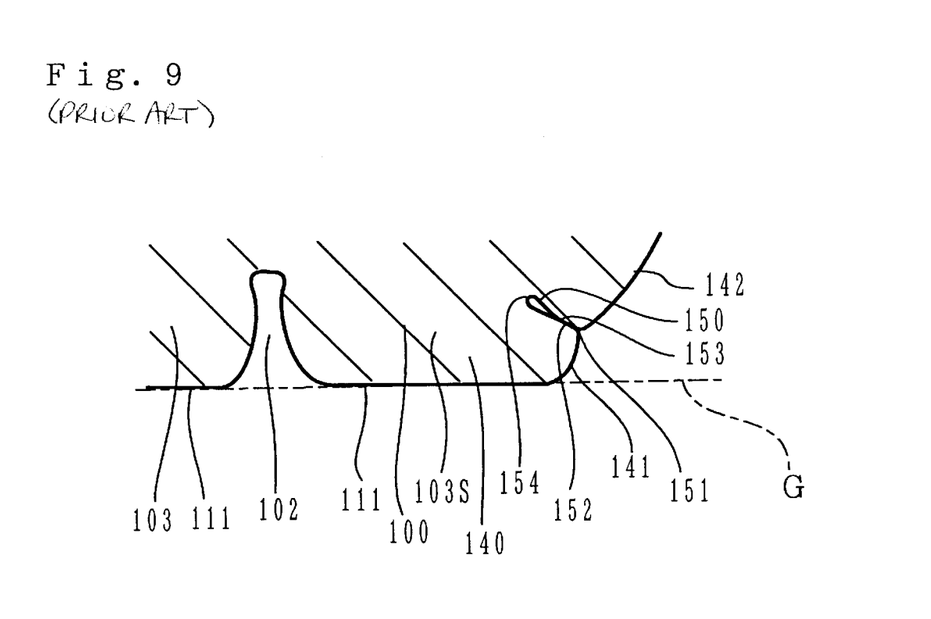
FIG. 9 is a schematic local sectional view of the tread portion showing the grounding state of the tire shown in FIG. 8.
Figure 10:
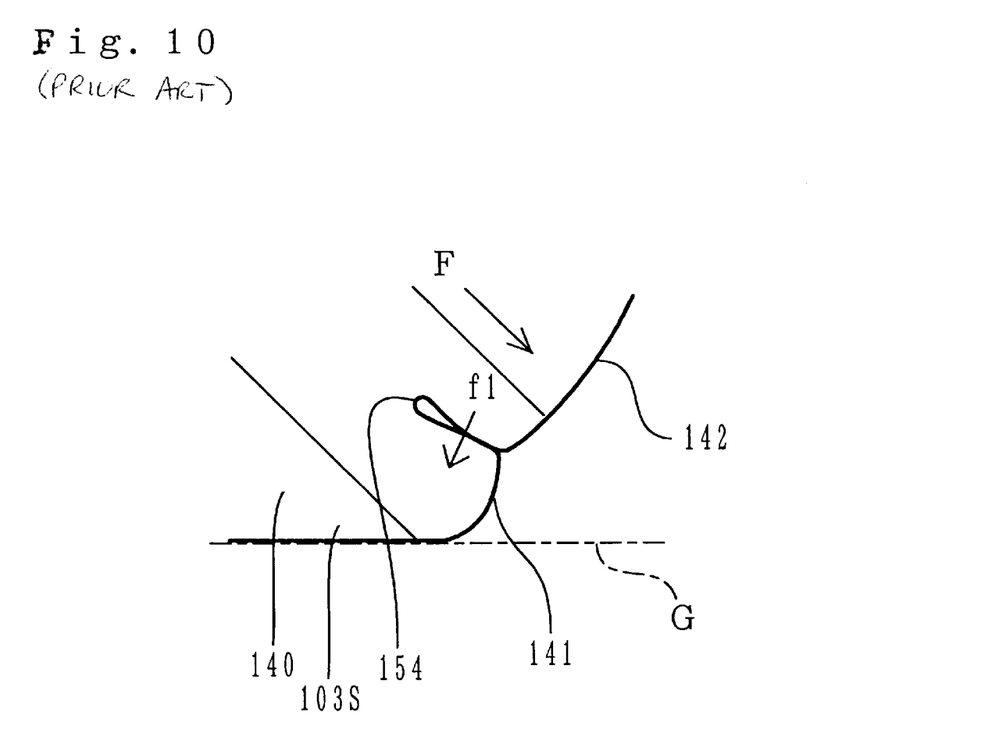
FIG. 10 is an enlarged schematic local sectional view showing the grounding state in the vicinity of the shoulder portion in FIG. 9.
Figure 11:
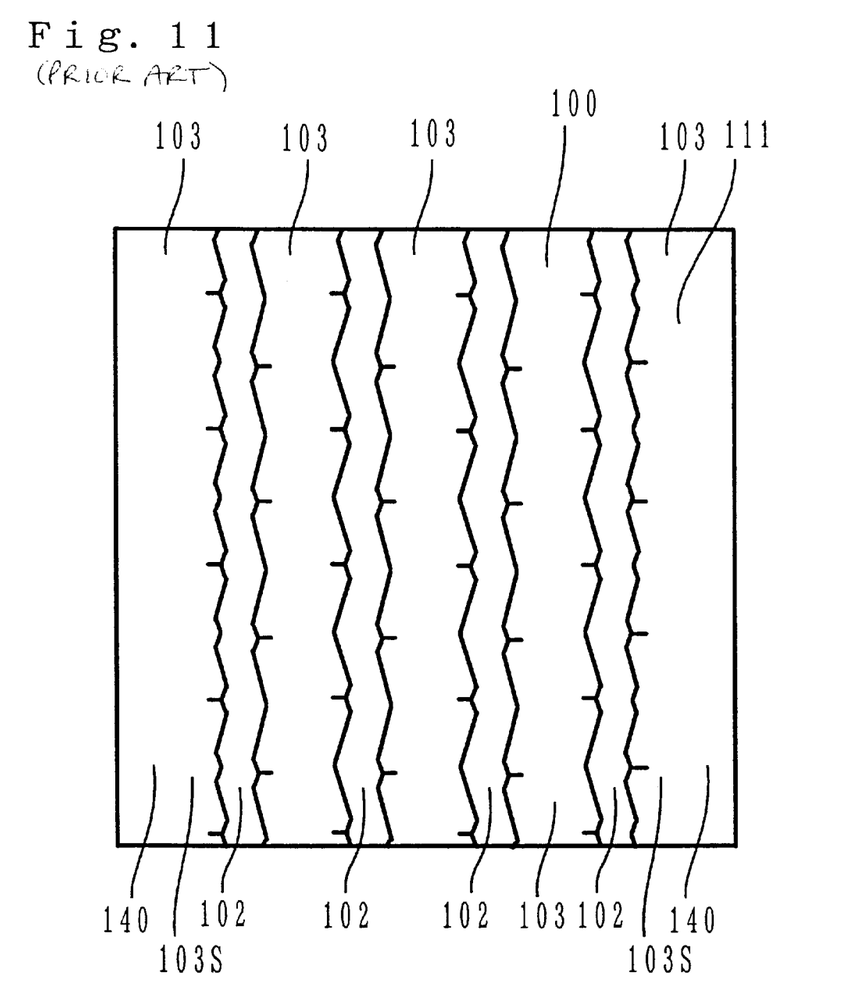
FIG. 11 is a schematic top view showing the tread patterns of the said conventional tire.

Heretofore, in order to improve uneven wear, for example, a tire as shown in FIG. 7 has been provided. FIG. 7 shows an example of the conventional heavy load pneumatic radial tire and shows a schematic local sectional view of the right half in the tire width direction from the center line CL which vertically and equally divides the cross sectional view into two. FIG. 8 shows a schematic local sectional view of the tread portion showing the non-grounding state at the time of filling standard pressure in the conventional tire. FIG. 9 shows a schematic local sectional view of the tread portion showing the grounding state of the tire shown in FIG. 8. FIG. 10 shows an enlarged schematic local sectional view of the tread portion showing the grounding state near the shoulder portion shown in FIG. 9. FIG. 11 shows a schematic top view representing the tread pattern of the conventional tire.

A tire shown in FIG. 7 is provided with the carcass CC, the tread portion 100 which covers the crown region of the carcass CC, and the belt 106 having plural of belt cords between the tread 100 and the crown region of the said carcass CC. In addition, a tire shown in FIG. 7 is a tire having plural of main grooves 102 which run circumferentially at the tread surface 111 of the said tread portion 100 and plural of ribs 103 divided by these main grooves 102. In the tire in FIG. 7, as shown in FIGS. 7 and 8, a circular fine groove 150 is provided in the side region 140 A of the shoulder portion 140 running on both sides of the surface 111 of the tread portion 100 with the aperture 151 whose one end is opened to the side region 140 A. This fine groove 150 is the fine groove of straight groove sectional view having substantially the same groove width from the aperture 151 to the groove bottom 154. In other words, this fine groove 150 comprises the external wall 152 of the external side in the tire diameter direction leading to the external side 141 in the tire diameter direction of the side region 140 A of the shoulder portion 140, the internal wall 153 of the internal side in the tire diameter direction leading to the internal side 142 in the tire diameter direction of the side region 140 A of the shoulder portion 140, and the groove bottom 154 leading to the said external wall 152 and the said internal wall 153. The said external wall 152 and the said internal wall 153 extend to the groove bottom in a substantially parallel manner.

In this conventional tire, the said fine groove 150 decreases the partially heavy grounding pressure on the surface of the said rib 103 S, particularly on the surface of the end portion (rib 103 A) of the external side in the tire width direction since the force F to the external part in the tire width direction of the rib 103 S in the shoulder portion 140 which causes uneven wear, is diminished by the force required to fill the gap of the said fine groove.

However, when this conventional tire is filled with air at standard pressure and then loaded on the vehicle and driven, as shown in FIGS. 9 and 10, and when this tire contacts the ground surface G, the force F transmitted from the side wall SW which affects the rubber surrounding the said fine groove 150 makes the external wall 152 and the internal wall 153 of the fine groove 150 contact each other and acts as a force f1 indicated by arrow blocking in from the aperture 151 to the vicinity of the groove bottom.

Therefore, such force f1, as shown in FIG. 10, acts as the force to push the rib 103 S in the shoulder portion 140 in the grounding state into the internal side in the tire width direction (that is, the side of a center line which vertically and equally divides the cross sectional view of the tire into two), and in the surface of the said rib 103 S, its grounding pressure, particularly at the end of the tire width direction gets high on the ground surface. On the other hand, in accordance with the revolution of the tire at the time of driving, when the grounding state of the rib 103 S in the said shoulder portion 140 comes to be released, since the action by the force f1 against the said rib 103 S is gone, the fine groove 150 which has been compressed between the external wall 152 and internal wall 153 recovers to the initial state, the gains of the said grounding pressure on the surface of the said rib 103 S are released.

Thus, the above described phenomena are repeated in the conventional tire whenever the grounding and the non grounding state are repeated. Consequently, the conventional tire, as described above, although trying to prevent uneven wear, reducing the grounding pressure of the rib 103 S in the shoulder portion 140 by the said fine groove 150, right after the external wall 152 and the internal wall 153 in the fine groove 150 contact each other and block up, the grounding pressure begins to rise. Therefore, even if the conventional tire is provided with such fine grooves, it cannot be said that the tire fully prevents uneven wear which is likely to occur on the surface of the rib 103 S in the shoulder portion 140.

In addition, in the conventional tire, as described above, when it contacts the ground surface G, the force f1 makes the external wall 152 and internal wall 153 of the fine groove 150 contact and makes them block up from the aperture 151 to the vicinity of the back of the groove. Then by such force f1, the groove bottom 154 is compressed, leaving little gap of the fine groove 150, making the curvature of the groove bottom 154 big and making the deformation of groove bottom 154 big. And when the grounding state in this rib 103 S is released, the state recovers again to the state shown in FIG. 8 and the blocked-up state of the fine groove 150 is released. Therefore, since these phenomena are repeated at the time of driving, cracks are likely to be generated on groove walls, in particular, on groove bottom 154, and the tire life is likely to be damaged. These phenomena remarkably appear in the heavy load pneumatic radial tire used for trucks, buses, or the like, having heavy load on tires and driving on the well paved road for a long time and for a long distance.

SUMMARY OF THE INVENTION

The tire of the present invention is a heavy load pneumatic radial tire having a carcass, a tread portion which covers the crown region of the said carcass, a belt which comprises plural of belt cords between the tread portion and the said crown region of the said carcass, plural of main grooves running circumferentially on the tread surface of the said tread portion and plural of ribs divided by these main grooves, wherein:

the circular fine groove running in the tire circumferential direction and provided with an aperture at which one end is open to the side at one side of the said tire tread surface of the tread portion and at least at one side of the external region in the tire diameter direction of the side wall is provided;

the said fine groove has a narrowed area with the central axis of the sectional view of the groove sloping inward in the tire diameter direction from the said aperture to the internal part in the tire width direction and the groove width of the sectional view gets narrower as it goes from the said aperture to the back of the groove and an expanded area following thereafter whose groove width expands with a curvature;

the wall surface in the external diameter side of the narrowed area from the said aperture to the narrowest area of the said narrowed area slopes outward in the tire diameter direction than the central axis of the said sectional view of the groove and the wall surface in the internal diameter side of the said fine groove is provided with a convex part contacting the said wall surface in the external diameter side with pressure at the time of tire grounding;

when d represents the depth of the main groove nearest to the shoulder portion among the main grooves, and B represents the largest width of the groove width of the said expanded area, the bottom end of the groove at the innermost side in the tire diameter direction of the expanded area of the said fine groove is set nearer to the external side in the tire diameter direction than the position with the distance of (d+½B) from the tread surface of the tread portion to the internal side in the tire diameter direction; and the bottom end of the groove at the innermost side in the tire width direction of the expanded area of the said fine groove is set nearer to the external side in the tire width direction than the position with the distance of d from the side of the said tire shoulder portion to the internal side in the tire width direction.

In the tire of the present invention, as described above, the said fine groove has a narrowed area with the central axis of the sectional view of the groove sloping inward in the tire diameter direction from the said aperture to the internal side in the tire width direction and the groove width of the sectional view gets narrower as it goes from the said aperture to the back of the groove and an expanded area following thereafter whose groove width expands with a curvature;

the wall surface in the external diameter side of the narrowed area from the said aperture to the narrowest area of the said narrowed area slopes outward in the tire diameter direction than the central axis of the said sectional view of the groove and the wall surface in the internal diameter side of the said fine groove is provided with a convex part contacting the said wall surface in the external diameter side with pressure at the time of tire grounding.

Therefore, when this tire is loaded on the vehicles and the rib in the shoulder portion contacts the ground, as a preferred embodiment, the said convex part contacts with pressure in the vicinity of the said narrowest area in the side wall surface of the external diameter sloping outward to the external side of the tire diameter direction than the central axis of the said sectional view of the groove, and the configuration of the expanded area prevents the contact between groove walls in the expanded area.

Since the tire of the present invention has the said configuration of the sectional view, the said convex part generates a slip after it contacts with pressure the said wall surface of the external diameter side of the fine groove and the convex part moves as if it goes into the relatively internal side in the tire width direction to the external side in the tire diameter direction than the fine groove. Therefore, the force F which is generated by the loading added to the tire is consumed as a friction energy and is transmitted as smaller force f1 and the convex part goes into the internal side in the tire width direction. By this, the deformation by bending of the side wall when the loading is added to the tire gets smooth and enlarges the diminution of the said force F similar to the case where the width of the fine groove in the conventional tire is enlarged. Thus, by taking this step, the grounding pressure of the shoulder rib in the external side in the tire width direction is further less likely to increase thereby capable of reducing the uneven wear of that part.

Moreover, in the tire of the present invention, the external wall and the internal wall of the fine groove contact each other in the vicinity of the said narrowest area at the time of driving. However, since the tire has the said groove sectional configuration, the groove as a whole does not block up to the groove bottom as seen in the conventional tire, and since the expanded area is formed with the groove width expanding with a curvature particularly at the groove bottom, in the configurational effect, too, the gap is not likely to get little as seen in the conventional tire and the curvature at the groove bottom is not likely to get large as seen in the conventional tire. Therefore, the crack initiation at the wall surface of the fine groove, especially at the groove bottom can be prevented, thereby enhancing the tire life.

Therefore, as a preferred embodiment, it is important that the expanded area of the fine groove of the present invention swells and expands in the internal side as well as the external side in the tire diameter direction and preferably expands with a curvature of a sectional arc or a substantial arc.

In addition, in the tire of the present invention, since the central axis of the groove sectional area of the fine groove slopes inward in the tire diameter direction from the said aperture to the internal side in the tire width direction and since the wall surface of the external side of the narrowed part from the said aperture to the narrowest part of the said narrowed part slopes outward in the tire diameter direction than the central axis of the said groove sectional area, even though the rib of the shoulder portion reduces to the internal side in the direction of tire diameter direction by a usual wear at the time of driving, the reduction in thickness at the end part of the shoulder portion in the tire diameter direction can be prevented. On the other hand, in the above described conventional tire, since the sectional view of the fine groove has a straight configuration, when the rib of the shoulder portion reduces to the internal side in the tire diameter direction by usual wear at the time of driving, the thickness in the sectional view of the rib in the tire diameter direction at the end part of the shoulder portion decreases, and the rib region in the external side in the tire external diameter direction of the fine groove, that is, the external side portion in the said tire diameter direction in the shoulder portion gets thin, thereby causing cracks or the like in the said part and it is not preferable from the viewpoint of durability. Since the tire of the present invention, compared with the conventional tire, can prevent the reduction in thickness in the external part in the said tire diameter direction, it enhances durability.

Although in the present invention, the position of the said fine grooves to be formed is not specifically limited, as a preferred embodiment, as described above, when d represents the depth of the main groove nearest to the shoulder portion among the said main grooves, and when B represents the largest width of the groove of the said expanded area, the bottom end of the groove at the innermost side in the tire diameter direction of the expanded area of the said fine groove is set nearer to the external side in the tire diameter direction than the position with the distance of (d+½B) from the said tread surface of the tread portion to the internal side in the tire diameter direction and the bottom end of the groove at the innermost side in the tire width direction of the expanded area of the said fine groove is set nearer to the external side in the tire width direction than the position with the distance of d from the said tire shoulder portion to the internal side in the tire width direction. The object of the present invention is to provide heavy load pneumatic radial tire capable of effectively preventing the crack initiation which is likely to occur at the groove wall or groove bottom provided in the side of the shoulder portion as well as further preventing the uneven wear appearing on the rib surface of the shoulder portion.

PREFERRED MODE OF CARRYING OUT THE INVENTION

Figure 2:
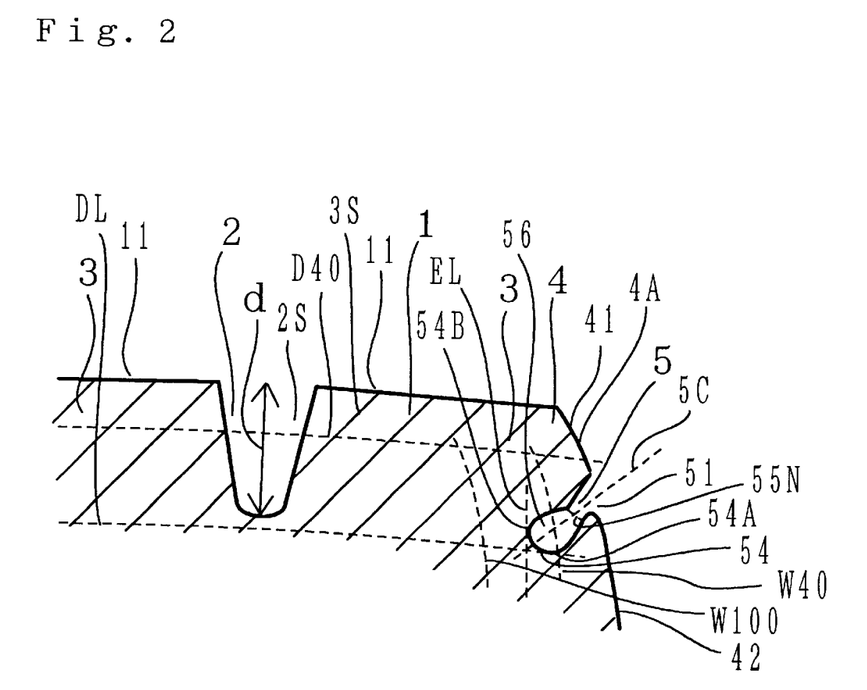
FIG. 2 is a schematic local sectional view of the tread portion of the said tire shown in FIG. 1 and is a local schematic sectional view in the non grounding state when the air is filled in the tire with standard internal pressure.
Figure 3:
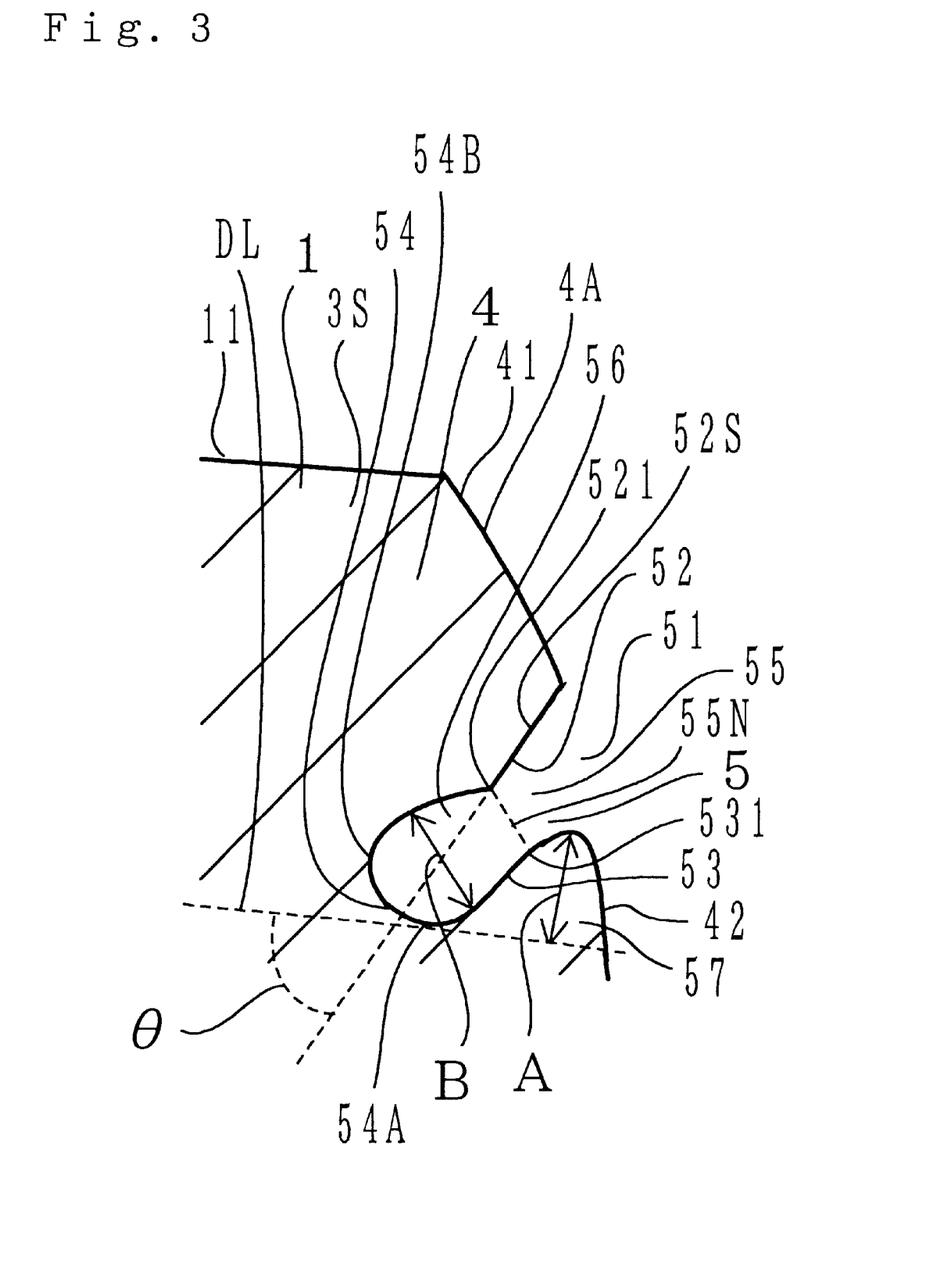
FIG. 3 is an enlarged schematic local view of FIG. 2 in the said tire.
Figure 4:
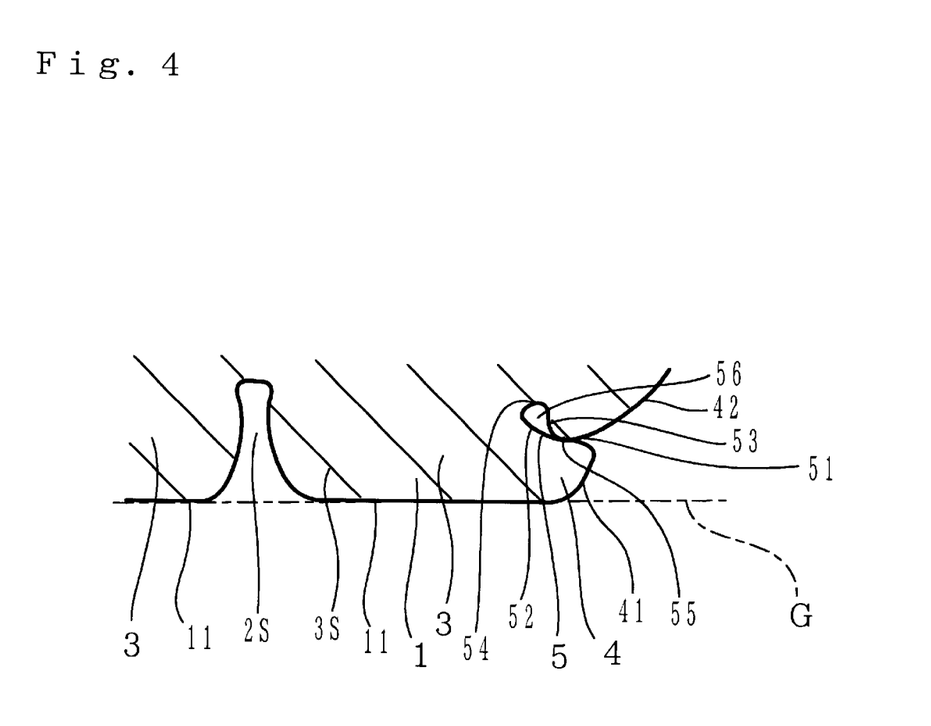
FIG. 4 is an enlarged schematic local sectional view in the grounding state when the air is filled in the tire with a standard internal pressure.
Figure 5:
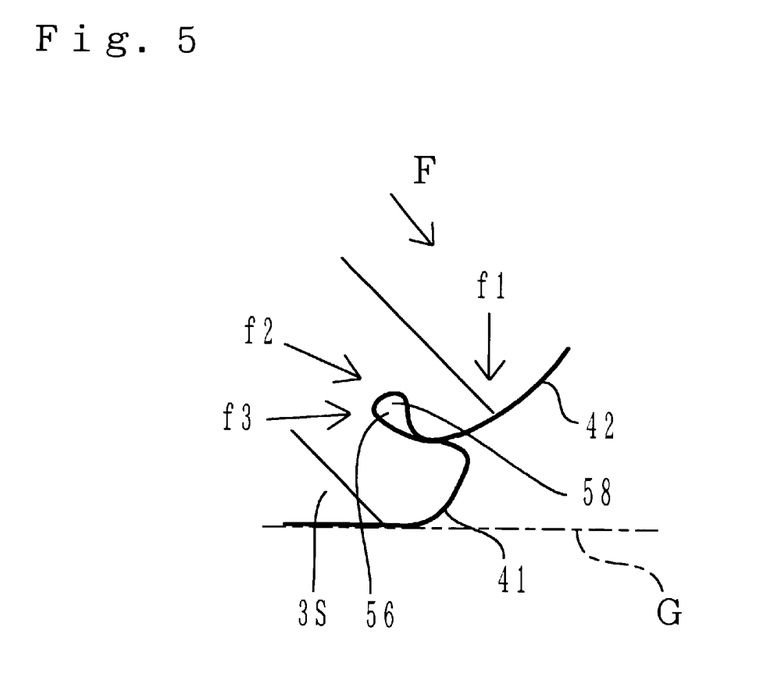
FIG. 5 is an enlarged schematic local sectional view showing by patterns the direction of the force affecting the rubber surrounding the fine grooves.
Figure 6:
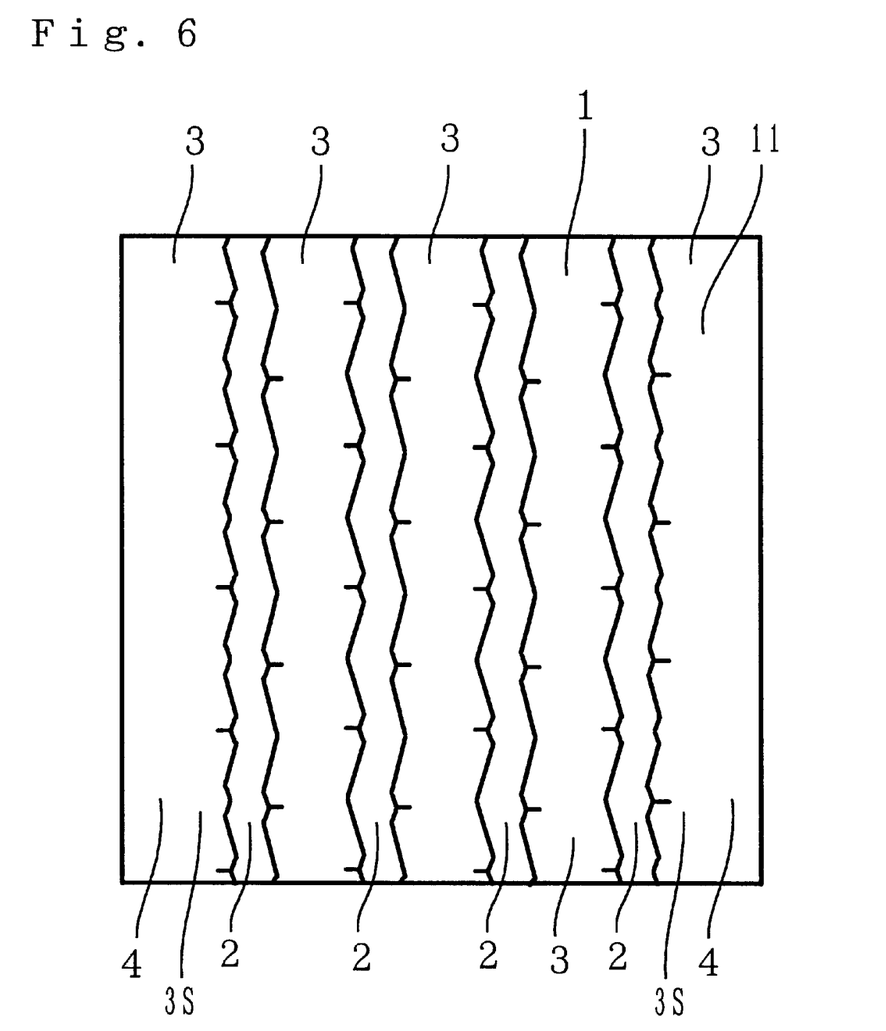
FIG. 6 is a schematic top view showing the tread patterns of the said tire.

As described above, FIG. 1 shows an embodiment of the heavy load pneumatic radial tire of the present invention and is a schematic local sectional view showing the right half in the tire width direction from the center line CL which vertically and equally divides the tire cross sectional view into two. FIG. 2 is a schematic local sectional view of the tread of the said tire shown in FIG. 1 and is a schematic local sectional view in the non grounding state when the air is filled in the tire with a standard pressure. FIG. 3 is an enlarged local schematic sectional view of FIG. 2, and FIG. 4 is an enlarged local schematic view in the grounding state (the state in which the rib of the shoulder portion contacts the ground surface) when the air is filled in the tire in FIGS. 2 and 3 with standard internal pressure. Similarly, FIG. 5 is an enlarged schematic local sectional view showing by patterns the direction of the force affecting the rubber surrounding the fine grooves in the grounding state when the air is filled in the tire with standard internal pressure. FIG. 6 is a schematic top view showing the tread patterns of the said tire.

Figure 1:
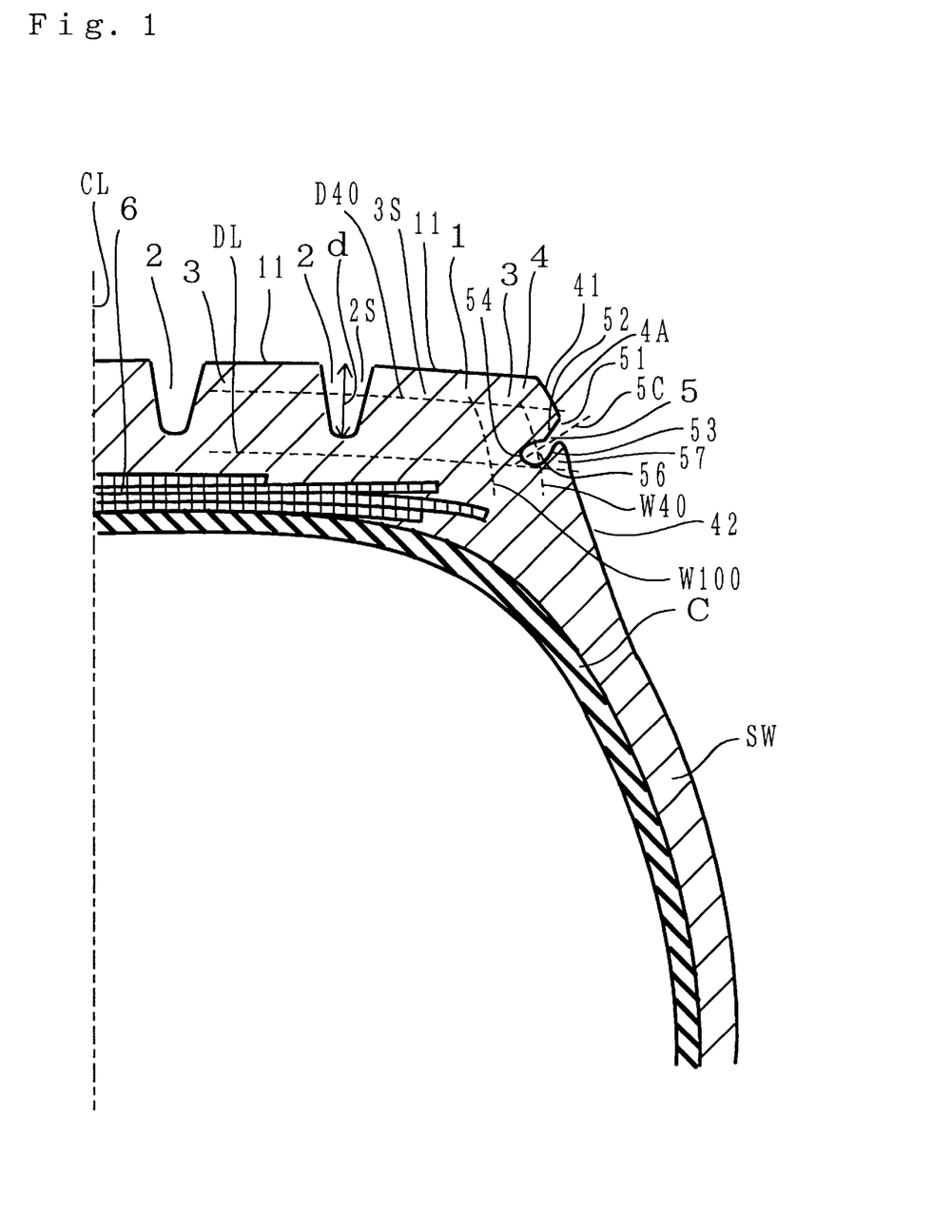
FIG. 1 shows an embodiment of the heavy load pneumatic radial tire of the present invention and is a local schematic sectional view showing the right half in the tire width direction from the center line CL which vertically and equally divides the tire cross sectional view into two.

The tire, as shown in FIG. 1, has the carcass C, the tread portion 1 which covers the crown region of the said carcass C, a belt 6 comprising plural of belt cords between the said tread portion 1 and the crown region of the said carcass C, plural of main grooves 2 running circumferentially on the tread surface 11 of the tread portion 1 and plural of ribs 3 divided by these main grooves 2. Numeral 4 shows a shoulder portion of the tread portion 1. For information, 2S shows the main groove which is nearest to the shoulder portion 4 among main grooves 2 and 3S shows the rib of the shoulder portion 4.

The tire, as shown in FIGS. 1 to 5, is provided with the circular fine groove 5 with the aperture 51 which runs in the tire circumferential direction and whose end is its side opened to the external region 4A in the tire diameter direction of the side wall in the external region 4A in the tire diameter direction of the side wall which is the side of the shoulder portion 4 running on both sides of the tread surface 11 of the said tread portion 1. This fine groove 5 has the narrowed area 55 with the central axis 5 C of the sectional view of the grooves sloping inward in the tire diameter direction from the said aperture 51 to the internal part in the tire width direction and with the groove width of the sectional view of the groove getting thin from the said aperture 51 to the back of the groove and the fine groove 5 has the expanded area 56 following thereafter whose groove width expands with a curvature and with the groove bottom 54 constructed at the end.

In addition, the fine groove 5 is provided with the convex part 57 (including the projection) in which the external wall 52 (the wall surface in the external diameter side) of the narrowed area 55 from the said aperture 51 to the narrowest area 55 N of the said narrowed area 55 slopes outward in the tire diameter direction than the central axis 5 C of the said sectional view of the groove and which contacts the said external wall 52 with pressure at the time of tire grounding in the internal wall 53 (the wall surface in the internal diameter side) of the said fine groove 5.

For information, there is the external part 41 in the tire diameter direction in the external region 4A in the tire diameter direction of the side wall which is the side of the shoulder portion of the external side in the tire diameter direction of the aperture 51 of the fine groove 5, and there is the internal part 42 in the tire diameter direction in the external region 4A in the tire diameter direction of the side wall which is the side of the shoulder portion of the internal side in the tire diameter direction.

This fine groove 5 is so constructed that when d represents the depth of the main groove 2S which is nearest to the shoulder portion 4 among the said main grooves 5 and when B represents the largest width of the groove of the said expanded area 56, the position of the end of the groove bottom 54 A which is the innermost in the tire diameter direction in the expanded area 56 of the fine groove 5 is set nearer to the external side in the tire diameter direction than the position DL which goes into the distance of (d+½B) to the internal side in the tire diameter direction from the tread surface 11 of the said tread portion 1 and the position of the end of the groove bottom 54 B which is the innermost in the tire width direction in the expanded area B of the said fine groove 5 is set nearer to the external side in the tire width direction than the position W 100 which goes into the distance of d in the internal side in the tire width direction from the side of the said shoulder portion 4.

Therefore, when this tire is loaded on the vehicle and the rib 3S in the shoulder portion 4 contacts the ground, the said convex part 57 contacts the ground with pressure in the vicinity of the said narrowest area 55 N of the external wall 52 (the wall surface in the external diameter side) which slopes outward in the tire diameter direction than the central axis 5 C of the said sectional view of the groove and further, the configuration of the expanded area 56 prevents the contact between the groove walls in the expanded area 56. After the said convex part 57 contacts the external wall 52 of the aperture 51 with pressure, the wall surface 52 and the convex part 57 generate a slip, and the convex part moves as if it goes into the external side in the tire diameter direction of the fine groove 5, that is, relatively internal side in the tire width direction to the side 41 of the said shoulder portion. Therefore, a part of the force F which is generated by the loading added to the tire is consumed as friction energy by the said slip and is transmitted as less force f1 as shown in FIG. 5 and the convex part 57 goes into the internal side in the tire width direction. By this, the bending deformation of the side wall SW in the grounding part when the loading is added to the tire gets smooth, enlarging the diminution of the said force F, similar in the case when the width of the fine groove 150 in the conventional tire in FIG. 7 is enlarged. Thus, it is further less likely to increase the grounding pressure in the external part in the tire width direction of the shoulder rib 3S and the uneven wear of the part can be prevented. For information, f2 and f3 in FIG. 5 show the element of the force of other directions transmitted by the said F.

Further, in addition, although the external wall 52 and the internal wall 53 of the fine groove 5 contact each other in the vicinity of the said narrowest part 55N by the convex part 57 of the internal wall 53, since the tire has the said groove sectional configuration, the groove as a whole does not block up to the groove bottom 54 as seen in the case of the conventional tire. In particular, since at the back of the groove, the expanded area 56 with the groove width expanding with a curvature is formed, from the view point of the configuration effect as well, there is no case where the gap of the fine groove gets small as seen in the case of the conventional tire. Thus, as shown in FIG. 5, the gap 58 of the fine groove 5 is maintained and the curvature at the groove bottom 54 does not get large as seen in the conventional tire. Therefore, at the time of driving, the crack initiation in the wall surfaces 52 and 53 and particularly in the groove bottom 54 of the fine groove 5 can be prevented, thereby capable of improving the tire life.

Further, in the tire of this embodiment, since the central axis 5C of the groove sectional view of the fine groove 5 slopes inward into the internal side in the tire width direction from the aperture 51, and since the external wall 52 of the narrowed area 55 from the said aperture 51 to the narrowest area N of the said narrowed area 55 slopes outward in the tire diameter direction than the central axis 5C of the said groove sectional view, even though the rib 3S of the shoulder portion 4 decreases and goes into the internal side in the tire diameter direction by the ordinary wear at the time of driving, the decrease in thickness in the sectional view of the rib 3S in the tire diameter direction at the end of the shoulder portion 4 can be prevented. On the other hand, in the above described conventional tire, as mentioned before, since the sectional view of the fine groove 150 has a straight configuration, when the rib 140 A of the shoulder portion 140 decreases and goes into the internal side in the tire diameter direction by the ordinary wear at the time of driving, the thickness in the sectional view of the rib 103 S in the tire diameter direction at the end 103 A of the shoulder portion 140 decreases, and the rib region in the external side in the tire external diameter direction of the fine groove 150, that is, the external part 141 in the tire diameter direction of the side of the shoulder portion gets thin, thereby causing cracks or the like in the said part, which is not preferable from the view point of durability. The tire of the present embodiment can prevent the decrease in thickness in the said external side 41 in the tire diameter direction better than the conventional tire, thereby enhancing durability.

Moreover, in the tire of the present embodiment, the said fine grove 5 is set in the above described position. When the position of the groove bottom end 54 A, which is the innermost in the tire diameter direction in the expanded area 56 of the said fine groove 5, is set nearer to the internal side in the tire diameter direction than the position going inward by the distance of (d+½B) in the tire diameter direction from the tread surface 11 of the said tread portion 1 (that is, the tire revolutionary axis direction), the groove bottom 54 of the fine groove 5 gets nearer to the belt portion 6 made of steel, or the like, as a reinforcing material of the tread portion, the deformation of the rubber surrounding the said belt portion 6 increases, and the crack of the rubber from the vicinity of the groove bottom 54 of the said fine groove 5 to the region surrounding the said belt portion 6 is likely to be generated. In addition, when the position of the groove bottom end 54 B, which is the innermost in the tire width direction in the expanded area 56 of the said fine groove 5 is set nearer to the internal side in the tire width direction than the position going inward by the distance of d in the tire width direction (that is, the side of the central line CL which vertically and equally divides the tire cross sectional view into two), similar to the above case, the groove bottom 54 of the fine groove 5 gets nearer to the belt portion 6 made of steel, or the like, as a reinforcing material of the tread portion, the deformation of the rubber surrounding the said belt portion 6 increases, and the crack of the rubber from the vicinity of the groove bottom 54 of the said fine groove 5 to the region surrounding the said belt portion 6 is likely to be generated. Therefore, it is preferable that the fine groove 5 related to the present invention is formed on the above described position.

For information, in FIGS. 1 to 3, D 40 is the line showing the position which goes in by 40% of the depth d of the said main groove 2S in the tire diameter direction from the tread surface 11 of the tread portion and is the virtual line parallel to the tread surface 11 of the tread portion. DL is the line showing the position which goes internal side in the tire diameter direction by the distance of (d+½B) from the tread surface 11 of the tread portion and is the virtual line parallel to the tread surface 11 of the tread portion. A is the shortest distance between the line which passes through the internal end in the tire diameter direction of the fine groove bottom 54 and from the parallel line to the tread surface 11 of the tread portion 1 to the external end in the tire diameter direction in the internal side in the tire diameter direction of the fine groove 5 (that is, the height of the convexity in the convex part). B is the maximum width of the expanded area 56 of the fine groove. W 40 is the line showing the position going inward in the tire width direction by the distance of 0.4 d from the side face of the shoulder portion and is the virtual line parallel to the side of the shoulder portion. W 100 is the line showing the position going inward in the tire width direction by the distance of d from the side of the shoulder portion and is the virtual line parallel to the side face of the shoulder portion. 57 is the area surrounded by the line which passes through the internal end in the tire diameter direction of the groove bottom 54 of the fine groove 5 in the convex part, the internal wall 53, and the internal side 42 in the tire diameter direction of the side face of the shoulder portion.

Here, the narrowest area 55 N of the present invention, as shown in FIG. 3, for example, shows the part where the narrowed area 55 and the expanded area 56 are connected. It also shows the part which connects the part 521 of the external wall 52 and the part 531, that is the linear shortest distance from the part 521 of the external wall 52 to the internal wall 53. In addition, the said central axis 5C refers to, as shown in FIG. 2, for example, the line which links the intersection point of the line EL, the line passing through the innermost end in the tire width direction of the groove bottom 54 of the fine groove 5 and the line parallel to the central line which vertically and equally divides the tire cross sectional view into two and the line passing through the innermost end in the tire diameter direction of the groove bottom 54 and the line parallel to the tread surface of the tread portion and the center of the said narrowest area 55 N.

For information, in the present invention, it is preferable that the position of the aperture 51 of the said fine groove is set nearer to the internal side in the tire diameter direction than the intersection point of the said line D 40 and the side face 4A of the said shoulder portion 4 and the position of the groove bottom end 54 B which is the innermost in the tire width direction in the expanded area 56 of the said fine groove 5 is set nearer to the internal side in the tire width direction than the said position W 40. The reason is that when the position of the aperture 51 of the said fine groove is set nearer to the side of the shoulder portion in the external side in the tire diameter direction than the intersection point of the said line D 40 and the side of the said shoulder portion 4, the rigidity of the tread rubber layer in the external side in the tire diameter direction adjacent to the groove bottom 5 arranged in the rib 3S decreases and the said tread rubber layer is likely to be damaged when the tire runs on to the curb, or the like. In addition, when the position of the groove bottom end which is the innermost in the tire width direction in the expanded area 56 of the said fine groove 5 is set nearer to the external side in the tire width direction than the said position W 40, the force necessary to block up the fine groove 5 becomes excessive and the force F based on the loading to the tire is transmitted without any diminution before the fine groove blocks up. Then, the effect to reduce the partial heavy grounding pressure at the end portion in the tire width direction of the rib 3S of the shoulder portion, the cause of uneven wear becomes weaker. As a result, the effect to prevent the crack initiation generated on the surface of the rib 3 S of the shoulder portion 4 becomes weaker.

For information, as shown in FIG. 3, the said fine groove 5 comprises the external wall 52 connecting the external side 41 in the tire diameter direction of the side of the shoulder portion, the internal wall 53 connecting the internal side 42 in the tire diameter direction of the side of the shoulder portion, and the groove bottom 54 connecting the said external wall 52 and the said internal wall 53. Here, it is preferable that the sectional view between the external side in the tire diameter direction of the said external wall 52 and the said narrowed area is constructed by the sloped portion 52 S. By this, when the sloped portion 52 S arranged from the external side of the tire diameter direction of the said external wall 52 to the said narrowed area contacts the said internal wall 53 at the time of tire grounding, the convex part 57 is likely to rub against the sloped portion 52 S. By this, the friction energy is consumed, thereby effectively reducing the partial heavy grounding pressure at the end portion in the tire width direction of the rib 3S in the shoulder portion.

Further, it is preferable that the crossed axes angle θ of the linear sloped portion 52 S and the line parallel to the tread surface 11 of the tread portion 1 is 40° to 75°. Thus, when the said crossed axes angle θ is less than 40°, as the tread 1 wears, the sectional view at the end portion in the tire width direction of the external side in the tire diameter direction gets acute, thereby causing external injury. Taking the said injury as a start, the tire is likely to get damaged. On the other hand, when the crossed axes angle exceeds 75°, the distance which the sloped portion 52 S of the external wall 52 of the fine groove 5 contacts the convex part 57 gets long, and the diminution of the force F based on the loading of the tire gets big, which increases the effect in preventing uneven wear. However, when they fully contact each other, the expanded area 56 is excessively compressed and the curvature of the expanded area gets big. Therefore, the crack is likely to be generated at the groove bottom 54, thereby making the tire life shorter.

It is further preferable that the relationship between the said A and the said B of the fine groove 5 is A<B. This is because when A>B, the rigidity of the convex part 57 decreases and the convex part 57 is likely to buckle when the sloped portion 52 S of the external wall 52 of the fine groove 5 and the internal wall 53 contact each other at the time of tire grounding, and as a result of buckling, the curvature of the expanded area cannot be kept small, thereby reducing the effect of preventing the crack.

For information, it is most suitable that the width of the said aperture 51 is 4 mm to 12 mm, the width of the narrowest area 55 is 1 mm to 3 mm, and the maximum width of the said expanded area is 3 mm to 6 mm.

In addition, it is important that the configuration of the sectional view of the said expanded area 56 draws a smooth arc in order to maintain a gap of the expanded area 56 of the fine groove 5 at the time of tire grounding.

Moreover, the reason of the arrangement of the narrowed area 55 between the aperture 51 of the fine groove 5 and the expanded area 56 is to form at least the sloped portion 52 of the said aperture and the said convex part 57.

EXAMPLE 50 heavy load pneumatic radial tires as shown in Tables 1 and 2 below and with the tire size of 11 R 22.5 144/141L were prepared, respectively.

Next, these tires were loaded on the front wheel of the vehicle and were driven 100,000 km on an open road with the air internal pressure of 760 kPa and with a standard load regulated by JIS. Then, the uneven wear resistance on the tread surface of the tire shoulder portion and the crack resistance in the wall of the fine grooves provided at the side of the shoulder portion were evaluated. Tires in the Comparative Example show the conventional tires as described above. For information, the tread patterns of the tire in the Example are shown in FIG. 6. In addition, the tread patterns of the tire in the Comparative Example are, as shown in FIG. 11, the same as those of the tire in the Example. For information, the number of figures and the numerical values are the same letters or numerals as those of the tire of the embodiment described above.

TABLE 1

(Depth of main grooves: all the 4 main grooves in the Example and Comparative Example: 14.5 mm)

| Fine grooves | Example | Comparative Example |
|---|---|---|
| Configuration of sectional view | FIG. 1 | FIG. 7 |
| Groove width of aperture | 5.8 mm | 3.7 mm |
| Groove width of narrowest area | 2.6 mm | — |
| Crossed axes angle with the line parallel to the tread surface 111 of external & internal wall | — | 40° |
| Angle θ in FIG. 3 | 60° | — |
| Difference between the angle of central axis 5 C. and θ | 23° | — |
| Convex part A in FIG. 3 | 4.0 mm | — |
| Width of expanded area (B) | 4.2 mm | — |
| Position of the external end in the tire diameter direction of the aperture | The crossing point of the side of shoulder portion and the line passing through the position going into 55% of the depth of the main grooves (glyphs) of the internal side in the tire diameter direction from the tread surface of the tread portion and parallel to the tread surface of the tread portion. | The crossing point of the side of shoulder portion and the line passing through the position going into 50% of the depth of the main grooves (glyphs) of the internal side in the tire diameter direction from the tread surface of the tread portion and parallel to the tread surface of the tread portion. |
| Position of 521, the external side in the tire diameter direction of the narrowest area | On the line parallel to the tread surface of the tread portion passing through the position going into 73% of the depth of main grooves (glyphs) from the tread surface of the tread portion and going into 54% of the depth of the main grooves in the tire width direction from the crossing point of the said parallel line and the side of the tire. | — |
| Position of 531, the internal side in the tire width direction of the narrowest area | On the line parallel to the tread surface of the tread portion passing through the position going into 80% of the depth of main grooves (glyphs) from the tread surface of the tread portion and going inward into 14% of the depth of the main grooves in the tire width direction from the crossing point of the said parallel line and the side of the tire. | — |

TABLE 2

(Depth of main grooves: all the 4 main grooves in the Example and Comparative Example: 14.5 mm)

| Fine grooves | Example | Comparative Example |
|---|---|---|
| Sectional view | FIG. 1 | FIG. 7 |
| Position of the external side in the tire diameter direction of the width of expanded area (B) | On the line parallel to the tread surface of the tread portion passing through the position going into 80% of the depth of main grooves (glyphs) from the tread surface of the tread portion and going into 44% of the depth of the main grooves in the tire width direction from the crossing point of the said parallel line and the side of the tire. | — |
| Position of the internal side in the tire diameter direction of the width of expanded area (B) | On the line parallel to the tread surface of the tread portion passing through the position going into 107% of the depth of main grooves (glyphs) from the tread surface of the tread portion and going internally into 34% of the depth of the main grooves in the tire width direction from the crossing point of the said parallel line | — |

TABLE 2-continued (Depth of main grooves: all the 4 main grooves in the Example and Comparative Example: 14.5 mm)

| Fine grooves | Example | Comparative Example |
|---|---|---|
| | and the side of the tire. | |
| Position of internal side in the tire diameter direction of groove bottom | The position going into 100% of the depth of main grooves (glyphs) from the tread surface of the tread portion in the tire diameter direction | The position going into 95% of the depth of main grooves (glyphs) from the tread surface of the tread portion in the tire diameter direction |
| Position of internal side in the tire width direction of groove bottom | The position going into 56% of the depth of main grooves from the side of the shoulder portion in the tire width direction | The position going into 45% of the depth of main grooves from the side of the shoulder portion in the tire width direction |

The evaluation method is described below.

Uneven wear resistance: By making the product of the average depth of the uneven wear portion on the tread surface of the tire shoulder portion, the average width of the uneven wear portion on the tread surface of the tire shoulder portion, and the peripheral length of the tread portion before driving, the result was represented by exponent, letting the value of Comparative Example 100. The smaller numerical value shows less uneven wear and is therefore preferable.

Crack resistance at the walls of fine grooves: By observing the crack initiation at the bottom of the fine groove, the number of tires with crack initiation was shown. The evaluation results were shown in Table 3.

TABLE 3

| | Example | Comparative Example |
|---|---|---|
| Uneven wear resistance | 88 | 100 |
| Crack resistance in the walls of fine grooves | 0 | 50 |

From Table 3, it is found that the tire of the present invention has more excellent uneven wear resistance and crack resistance at the bottom of the fine groove compared with the conventional tire.

As explained so far, since the tire of the present invention is constructed as above, it can prevent cracks effectively at the bottom of the fine groove provided in the side of the shoulder portion of the heavy load pneumatic radial tire as well as preventing uneven wear generated on the rib surface of the shoulder portion.

The present application claims priority of Japanese application No.2001-224876, the disclosures of which are incorporated herein by reference. While a detailed description of the invention has been provided above, the present invention is not limited thereto and various modifications will be apparent to those of skill in the art. The invention is defined by the claims that follow.

What is claimed is:

1. A heavy load pneumatic radial tire having a carcass, a pair of sidewalls, a tread portion which covers the crown region of the said carcass, a belt which comprises plural belt cords between the tread portion and the said crown region of the said carcass, plural main grooves running circumferentially on the tread surface of the said tread portion and plural ribs divided by these main grooves, wherein the heavy load pneumatic tire has the following characteristics;

a circular fine groove running in the tire circumferential direction and provided with an aperture at which one end is open to the external region in the tire diameter direction of the side wall is provided in a shoulder portion of the tread portion, the said fine groove has a narrowed area with the central axis of the sectional view of the fine groove sloping inward in the tire diameter direction from the said aperture in the tire width direction and the groove width of the fine groove gets narrower as it goes from the said aperture to a back of the fine groove and an expanded area following thereafter whose groove width expands with a curvature, the wall surface in the external diameter side of the narrowed area from the narrowest area of the said narrowed area to the said aperture slopes outward in the tire diameter direction with respect to the central axis of the said sectional view of the fine groove and the wall surface in the internal diameter side of the said fine groove is provided with a convex part contacting the said wall surface in the external diameter side with pressure at the time of tire grounding, and wherein the outer sloping wall surface in the external diameter side of the narrowed area is linear and directly connects the external region in the tire diameter direction of the sidewall and the expanded area, when d represents the depth of the main groove nearest to the shoulder portion of the tread portion among the main grooves, and B represents the largest width of the groove width of the said expanded area, the bottom end of the fine groove at the innermost side in the tire diameter direction of the expanded area of the said fine groove is set nearer to the external side in the tire diameter direction than the position with the distance of (d½B) from the tread surface of the tread portion to the internal side in the tire diameter direction, and the bottom end of the fine groove at the innermost side in the tire width direction of the expanded area of the said fine groove is set nearer to the external side in the tire width direction than the position with the distance of d from a side of the shoulder portion at the external region to the internal side in the tire width direction.

2. A heavy load pneumatic radial tire as set forth in claim 1, wherein;

the aperture of the said fine groove is set nearer to the internal side in the tire diameter direction than the intersection point of the line parallel to the tread surface of the tread portion at the position with the distance of 0.4 d to the internal side in the tire diameter direction from the tread surface of the tread portion and the side of the shoulder portion, and the bottom end at the innermost side in the tire width direction in the expanded area of the said fine groove is set nearer to the internal side in the tire width direction than the position with the distance of 0.4 d to the internal side in the tire width direction from the side of the shoulder portion.

* * * * *